(12) United States Patent
Bluhm et al.

(10) Patent No.: US 9,344,025 B2
(45) Date of Patent: May 17, 2016

(54) WIND FARM AND METHOD FOR OPERATING A WIND FARM

(75) Inventors: Roman Bluhm, Hamburg (DE); Jens Fortmann, Berlin (DE)

(73) Assignee: Senvion SE, Hamburg (DE)

( * ) Notice: Subject to any disclaimer, the term of this patent is extended or adjusted under 35 U.S.C. 154(b) by 491 days.

(21) Appl. No.: 13/824,271

(22) PCT Filed: Dec. 23, 2011

(86) PCT No.: PCT/EP2011/074028
§ 371 (c)(1),
(2), (4) Date: Mar. 15, 2013

(87) PCT Pub. No.: WO2012/089699
PCT Pub. Date: Jul. 5, 2012

(65) Prior Publication Data
US 2013/0175800 A1    Jul. 11, 2013

(30) Foreign Application Priority Data

Dec. 29, 2010   (DE) .......................... 10 2010 056 457

(51) Int. Cl.
| | |
|---|---|
| H02P 9/04 | (2006.01) |
| F03D 7/02 | (2006.01) |
| F03D 7/04 | (2006.01) |
| F03D 9/00 | (2016.01) |
| H02J 3/38 | (2006.01) |

(52) U.S. Cl.
CPC ................ *H02P 9/04* (2013.01); *F03D 7/0284* (2013.01); *F03D 7/048* (2013.01); *F03D 9/005* (2013.01); *H02J 3/386* (2013.01); *F05B 2270/1071* (2013.01); *F05B 2270/337* (2013.01); *Y02E 10/723* (2013.01); *Y02E 10/763* (2013.01)

(58) Field of Classification Search
None
See application file for complete search history.

(56) References Cited

U.S. PATENT DOCUMENTS

| | | | |
|---|---|---|---|
| 2009/0096211 A1* | 4/2009 | Stiesdal | 290/44 |
| 2010/0207463 A1 | 8/2010 | Fortmann et al. | |
| 2012/0146423 A1* | 6/2012 | Bodewes et al. | 307/84 |

FOREIGN PATENT DOCUMENTS

| | | |
|---|---|---|
| DE | 10 2007 017 870 | 10/2008 |
| EP | 1 512 869 | 3/2005 |
| WO | WO-02/086315 | 10/2002 |
| WO | WO-2007/006565 | 1/2007 |

OTHER PUBLICATIONS

International Preliminary Report on Patentability dated Jul. 2, 2013, directed to International Application No. PCT/EP2011/074028; 8 pages.
International Search Report mailed Jul. 25, 2012, directed to International PCT/EP2011/074028; 7 pages.

\* cited by examiner

*Primary Examiner* — Jared Fureman
*Assistant Examiner* — Aqeel Bukhari
(74) *Attorney, Agent, or Firm* — Morrison & Foerster LLP

(57) ABSTRACT

A method for operating a wind farm and to a wind farm is disclosed. When a wind farm and the wind energy installations involve target values for the reactive power being prescribed by a farm regulatory device, said target values for the reactive power ignored by the control units when controlling the respective wind energy installation in the event of a power supply system fault in the power supply system. Only when the power supply system fault has been rectified are said target values considered by the control units again for controlling the respective wind energy installation.

9 Claims, 3 Drawing Sheets

WIND FARM AND METHOD FOR OPERATING A WIND FARM

REFERENCE TO RELATED APPLICATIONS

This application is a national stage application under 35 USC 371 of International Application No. PCT/EP2011/074028, filed Dec. 23, 2011, which claims the priority of German Application No. 10 2010 056 457.5, filed Dec. 29, 2010, the entire contents of which are incorporated herein by reference.

FIELD OF THE INVENTION

The invention relates to a method for operating a wind farm and to a wind farm.

BACKGROUND OF THE INVENTION

Wind farms usually comprise a plurality of wind energy installations, wherein the power generated in the wind energy installations is first fed into a grid internal to the wind farm. At a transfer point, the power is fed out of the grid internal to the wind farm into an external supply grid. Usually the grid internal to the wind farm is a medium-voltage grid, whereas the external supply grid is a high-voltage grid. A transformer with which the voltage of the medium-voltage grid is transformed to the voltage of the high-voltage grid is then provided at the transfer point.

As a result of the high electrical power installed in a wind farm, the connection of such wind farms to supply grids is not without problems. In particular it is necessary to pay attention to maintaining a high electrical quality in the supply grid. Amongst the ways in which this is ensured is that the wind farm that is connected to a supply grid has to observe strict specifications governing the quality of the supplied power. Thus, for example, the power fed into the supply grid must maintain a certain ratio—known as the power factor—between the reactive power and the real power. Even when disturbances occur in the supply grid, the requirements for the quality of the supplied power must be maintained. One example of such disturbances are voltage dips that can result from a short circuit or from a sudden failure of generating station output power.

A farm regulatory device, also known as the "farm master", is usually provided in wind farms; it functions as a high-level control apparatus for the individual wind energy installations of the wind farm, and can send control signals to the control equipment of the individual wind energy installations. The farm regulatory device thus has the task of monitoring and ensuring maintenance of the requirements for feeding electrical power into the supply grid. The farm regulatory device is therefore designed to affect the control apparatus of the individual wind energy installations in such a way that the requirements for feeding electrical power to the supply grid are indeed satisfied at the transfer point. The farm regulatory device here in particular has the task of monitoring and regulating the reactive power delivered to the supply grid, for which purpose it determines setpoint values of reactive power for the individual wind energy installations and is able to convey them to their control units. The regulation of the reactive power by the farm regulatory device can be oriented around the complex power measured at the transfer point, or the voltage in the supply grid.

If a disturbance occurs in the supply grid, the farm regulatory device of a wind farm calculates new setpoint values of reactive power for the individual wind energy installations of the wind farm in accordance with the prior art. These setpoint values of reactive power are then passed to the individual wind energy installations and have an effect on their control. The calculation and communication of the setpoint values of reactive power does take a certain amount of time, which means that, at least in the case of a disturbance in the supply grid, the requirements on the quality of the power supplied by the wind farm cannot be satisfied continuously.

SUMMARY OF THE INVENTION

On the basis of the prior art mentioned above, the invention addresses the task of providing a method for operating a wind farm, and a wind farm, in which the behavior of the wind farm during a grid fault is improved.

The invention is fulfilled by a method and a wind farm as broadly described herein. Advantageous further developments emerge from the detailed embodiments described below.

The invention accordingly relates to a method for operating a wind farm with a plurality of wind energy installations connected to a grid internal to the wind farm, each with its own control unit for considering setpoint values for the reactive power, a transfer point at which the power generated in the wind farm is passed from the grid internal to the wind farm to a supply grid, and with a farm regulatory device for regulating the setpoint values for the reactive power connected with the control units of the wind energy installations, wherein, when a grid fault occurs, the setpoint values for the reactive power of the farm regulatory device are not considered by the control units in controlling the wind energy installation and, after the grid fault has ended, the setpoint values for the reactive power of the farm regulatory device are considered by the control units in controlling the wind energy installation.

The invention furthermore relates to a wind farm comprising a plurality of wind energy installations connected to a grid internal to the wind farm, each with its own control unit for considering setpoint values for the reactive power, a transfer point at which the electrical energy generated in the wind farm is passed from the grid internal to the wind farm to a supply grid, and a farm regulatory device for regulating the setpoint values for the reactive power connected with the control units of the wind energy installations, wherein the control units are constructed such that when a grid fault occurs, the setpoint values for the reactive power of the farm regulatory device are not considered in controlling the wind energy installation and, after the grid fault has ended, the setpoint values for the reactive power of the farm regulatory device are considered in controlling the wind energy installation.

If, as a result of a grid fault, a voltage dip occurs in the supply grid, a voltage dip also occurs as a consequence in the grid internal to the wind farm. The control equipment of the individual wind energy installations are designed, according to the invention, such, as to be able to recognize such a voltage dip (e.g. using sensors and/or voltage meters) and to react to it in such a way that damage to the wind energy installations or their components is prevented. In such a case, the setpoint values for the reactive power are no longer considered by the control equipment. As soon as the grid fault has been rectified, and the voltage in the supply grid and in the grid internal to the wind farm has thus returned to a normal level, the control units of the individual wind energy installations again base the regulation of the wind energy installations on the setpoint values for the reactive power determined by the farm regulatory device.

It is possible to allow the farm regulatory device to continue to run unchanged during a grid fault, even if the setpoint values for the reactive power are not considered by the control units of the individual wind energy installations during the grid fault. Since the farm regulatory device nevertheless considers as input values the complex power or voltage measured in the supply grid, and this changes sharply during a grid fault, the setpoint values for reactive power specified by the farm regulatory device change. As soon as the grid fault is rectified, and normal voltage is therefore again present in the supply grid, the setpoint values for reactive power changed by the grid fault must be adjusted to the conditions following the grid fault.

In order to be able to satisfy the requirements on feeding power to the supply grid immediately following the rectification of a grid fault, it is alternatively possible to set the setpoint value for reactive power to 0 during a grid disturbance. At the same time, the setpoint values for real power are also set to 0 by the control units of the wind energy installations. After the rectification of the grid fault, the farm regulatory device can then again modify the setpoint values for reactive power, starting from these 0 values, until they reach a value that, on the one hand, is appropriate for the requirements of feeding power to the supply grid and, at the same time, ensures that all the power that can be generated by the wind energy installations is supplied.

The adjustment, described above, of the setpoint values for the reactive power after the grid fault has ended can take a certain amount of time, during which the requirements on feeding power to the supply grid may not be continuously satisfied, or unwanted jumps in the voltage in the grid internal to the wind farm (and therefore also in the supply grid) will occur if, after rectification of a grid fault, the total power supplied by the wind farm before the occurrence of the grid fault is initially missing and is only gradually restored to the level prior to the grid fault. It is therefore preferable if, when a grid fault occurs in the supply grid, the setpoint values for the reactive power are frozen in the farm regulatory device and, after the grid fault in the supply grid has ended, the regulation is continued on the basis of the frozen setpoint values for the reactive power. If necessary, independent protection can be claimed for this freezing of the setpoint values for the reactive power.

"Frozen values" means that corresponding values are held constant. The output of the regulation is therefore left unchanged, regardless of whether the regulation, or part of it, attempts to change these values. The output of the regulation then remains unchanged, for example, if at the output of the regulation, the instantaneous value of the regulation is present and the regulation is otherwise deactivated. It is, alternatively, possible to short-circuit the regulation or to halt the regulation. In a PI or PID regulation, freezing can also hold the I component and/or the P component constant. "Continuing the regulation on the basis of the frozen values" means that after the freeze of the values has ended, regulation continues on the basis of the previously frozen values.

In the case, in particular, of brief grid faults, the setpoint values for the reactive power in a wind farm prior to occurrence of the grid fault are practically identical to the ideal setpoint values for the reactive power after the brief grid fault has ended. At the least, the setpoint values from prior to the grid fault are so close to the ideal setpoint values after the grid fault that, if there is any deviation, the requirements for feeding power to a supply grid are nevertheless satisfied. In addition, the deviations mentioned above are usually so small that they can be overcome within a very brief time by the regulation of the farm regulatory device.

The regulation processes required to protect the individual wind energy installations or their components during grid faults are carried out by the control units at the individual, wind energy installations. The solution described however ensures that after the grid fault has ended the control units of the individual wind energy installations base their control on such setpoint values for real and reactive power that at the transfer point the total energy generated in the wind farm satisfies the requirements for feeding to the supply grid.

The setpoint values for the reactive power can preferably be present in the form of setpoint values for reactive power or setpoint values of voltage. If they are present as setpoint values for reactive power, they can be immediately considered by the control equipment of the wind energy installations. If the setpoint values of reactive power are present as setpoint values of voltage, the control equipment of the wind energy installations can determine the desired reactive power from the difference between the setpoint values of voltage and the voltage present at the individual wind energy installations in the grid internal to the wind farm. A corresponding local voltage regulation in the wind energy installation can be implemented by a P-regulator.

The setpoint values for the reactive power can preferably be determined from the complex power and/or the voltage in the supply grid. The complex power or the voltage in the supply grid can here be measured at the transfer point and supplied to the farm regulatory device. From this, the farm regulatory device then generates the setpoint values for the reactive power. It is, however, also possible for setpoint values from, for instance, the grid operator, to be supplied to the farm regulatory device, which the farm regulatory device can then convert into setpoint values for the reactive power and supply them to the control units of the individual wind energy installations.

Preferably a drop in the voltage in the supply grid is recognized as a grid fault. The voltage measured at the transfer point can be used to detect such a drop in voltage. It is also however possible for the farm regulatory device to receive a control signal from the operator of the supply grid that indicates a grid fault.

It is further preferable for a reset delay to be provided before the farm regulatory device continues the regulation on the basis of the frozen values after a grid fault has ended. In other words, the farm regulatory device should wait for a certain time before it once more begins to regulate setpoint values for the reactive power after a grid fault has ended. During this reset delay the frozen setpoint values for the reactive power continue to be supplied to the control units. This ensures that the dynamic processes following the return of voltage do not have negative effects on the farm regulation. The reset delay preferably is between 0 and 200 ms, more preferably 50 ms.

It is furthermore possible to provide that the freezing of the setpoint values for the reactive power takes place immediately when a grid fault is detected, the delay following the detection of a grid fault thus being 0 ms. As a result of freezing the setpoint values for the reactive power it is—unlike the situation in the prior art—not harmful if the farm regulatory device detects even small voltage peaks as grid faults and reacts immediately, i.e. freezes the setpoint values. It is far more advantageous that the farm regulatory device responds immediately to true grid faults.

The determination of setpoint values for the reactive power in the form of setpoint values for reactive power or setpoint values of voltage by the farm regulatory device can be achieved with the aid of a closed control loop comprising an integrating branch (I-branch). Such an I-branch acts on the controlled variable by integrating the control error over time, weighted by a reset time. In order to avoid unwanted effects from the I-branch after the grid fault has ended, the control error is preferably set to zero after the grid fault has ended. Setting the said control error to zero is preferably not done until a grid fault has lasted for a predefined period of time, and/or at a predefined deviation of the voltage from the normal voltage of the supply grid. Alternatively the said control error can also be held constant or frozen during a grid fault.

The wind farm according to the invention is constructed for carrying out the method according to the invention. Reference is therefore made to the above explanations.

BRIEF DESCRIPTION OF THE DRAWINGS

The invention will now be described by way of example with reference to advantageous forms of embodiment and with reference to the drawings. They show.

DETAILED DESCRIPTION OF THE INVENTION

Figure 1:
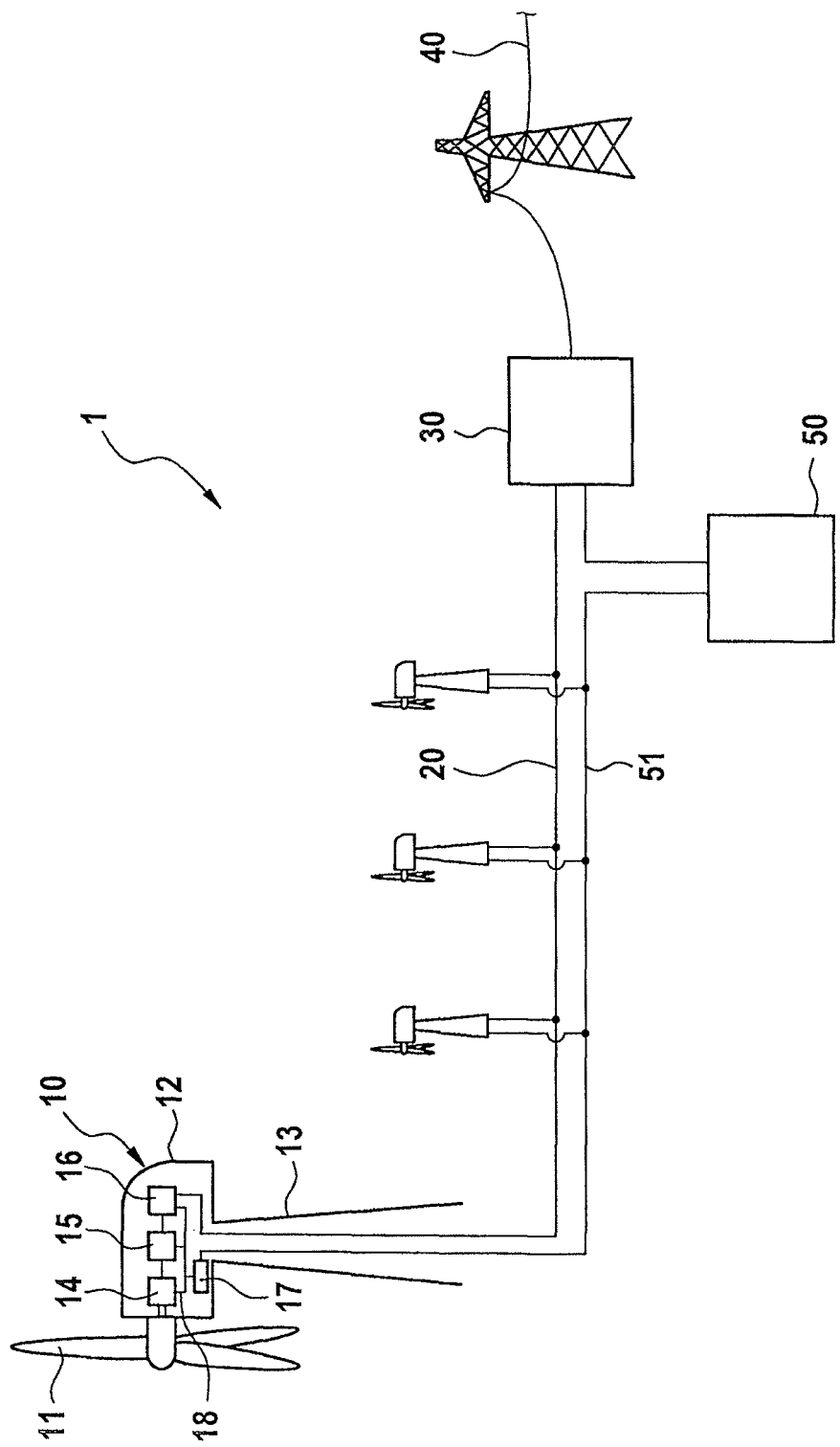
FIG. 1: a wind farm according to the invention.

A wind farm 1 according to the invention, constructed for carrying out the method according to the invention, is shown in FIG. 1.

The wind farm 1 here comprises a plurality of wind energy installations 10, of which one is shown in detail as an example. A wind energy installation 10 comprises a rotor 11 arranged rotatably on a nacelle 12 at the top of a tower 13. The rotor 11 drives a generator 14 which preferably can consist of a double-fed asynchronous generator. The generator is connected to an inverter 15. A transformer 16 that transforms the voltage output by the inverter 15 is also provided. The operation of the wind energy installation 10 is controlled by control equipment 17. This acts via control cables 18 on the individual components of the wind energy installation 10. In addition to the illustrated components, the wind energy installation 10 can of course comprise further components such as, for example, a pitch adjustment system for the rotor blades or actuator motors with which the nacelle 12 can be rotated with respect to the tower 13.

The wind energy installation 10 is connected to a grid 20 internal to the wind farm in such a way that the power generated by the wind energy installation 10 is fed into the grid 20 internal to the wind farm. A transfer point 30 is also connected to the grid 20 internal to the wind farm. Electrical power generated by the wind energy installations 10 is passed from the grid 20 internal to the wind farm into an external supply grid 40 at this transfer point 30. The grid 20 internal to the wind farm is a medium-voltage grid, whereas the supply grid 40 is a high-voltage grid. In order to be able to feed the power from the grid internal to the wind farm, the transfer point 30 comprises a transformer (not illustrated).

A farm regulatory device 50 is also provided and is connected via control cables 51 to the transfer point 30 and the control units 17 of the individual wind energy installations 10.

In order that the electrical power generated by the wind energy installations 10 can be fed to the supply grid 40, it must satisfy certain requirements. One of these requirements applies in particular to the power factor, i.e. the ratio between the real and reactive powers. Other requirements may be given in the form of a reactive power specification (Q setpoint value and/or tan-phi setpoint value), or by the voltage droop. Whereas the real power depends almost exclusively on the wind that moves the rotors 11 of the wind energy installations 10, the reactive power that is generated can be actively regulated, so that the desired power factor is maintained. It is not necessary for every wind energy installation 10 in a wind farm to satisfy these requirements; rather, it is sufficient if the power from the grid 20 internal to the wind farm is present at the transfer point 30 in such a way that—after being transformed, if necessary—it satisfies the requirements of the supply grid 40.

The farm regulatory device 50 is designed such, as to determine setpoint values for the reactive power so that the desired reactive power is present at the transfer point 30. The setpoint values for the reactive power can be determined on the basis of information about the supply grid 40 obtained at the transfer point 30. This can, in particular, be the complex power or the voltage in the grid internal to the wind farm or the supply grid 40. The values obtained at the transfer point 30 are transmitted via the control cables 51 to the farm regulatory device 50, where they provide the basis for determining the setpoint values for the reactive power.

The setpoint values for the reactive power are then sent from the farm regulatory device 50 via the control cables 51 to the control equipment 17 of the individual wind energy installations 10. The control equipment 17 is designed in such a way as to consider the setpoint values for the reactive power in controlling the wind energy installations 10. Because the wind energy installations 10 feed, in addition to real power, also reactive power, in accordance with the setpoint values received for the reactive power, into the grid 20 internal to the wind farm, the presence of the desired reactive power at the transfer point 30 is ensured.

When a grid fault occurs in the supply grid 40 this is usually also associated with a drop in the voltage in the supply grid 40. This drop in the voltage also translates through the transfer point 30 into the grid 20 internal to the wind farm. The control equipment 17 of the wind energy installations 10 is designed so that in the event of a corresponding drop in voltage, it will control the wind energy installation 10 in such a way that neither the wind energy installation 10 nor one of its components 11-16 are damaged, and also in such a way as to satisfy the special requirements for operation during a grid fault. During a grid fault, and the associated drop in voltage that also occurs in the grid 20 internal to the wind farm, the setpoint values for the reactive power originating from the farm regulatory device 50 are not considered by the control unit 17 of the wind energy installation 10, in order to be able to establish the special requirements for operation during a grid fault as quickly as possible and, in particular, to avoid a delay in communication through the farm regulatory device 50. Only after the grid fault has been rectified, and the voltage, as a result, has risen to a "normal" voltage level are the setpoint values for the reactive power considered again.

It is provided that during a corresponding grid fault the farm regulatory device 50 freezes, i.e. holds constant, the setpoint values for the reactive power, and that after the grid fault has ended, the regulation continues on the basis of the frozen setpoint values for the reactive power. As has already been described, the farm regulatory device 50 regulates the setpoint values for the reactive power on the basis of the complex power or the voltage in the supply grid 40 at the transfer point 30.

Freezing the setpoint values for the reactive power is based on the recognition that the setpoint values for the reactive power prior to a grid fault are identical, or at least are very close, to the ideal setpoint values for the reactive power after the grid fault. By freezing the setpoint values when a grid fault occurs, it is ensured that after the grid fault has ended setpoint values for the reactive power that are identical or at least are very close to the ideal setpoint values for the reactive power after the grid fault are supplied to the control units, so that at the transfer point 30 the requirements of the supply grid 40 for feeding power into the supply grid 40 are satisfied. The regulation of the setpoint values for the reactive power can then be continued on the basis of the previously frozen setpoint values. This method ensures that the setpoint values for the reactive power after the grid fault are not affected, as they are in the prior art, in such a way that after the grid fault has ended they differ from the ideal setpoint values to the extent that the requirements for feeding power to the supply grid 40 at the transfer point 30 are no longer satisfied, or are only achieved after a regulation settling process.

Figure 2:
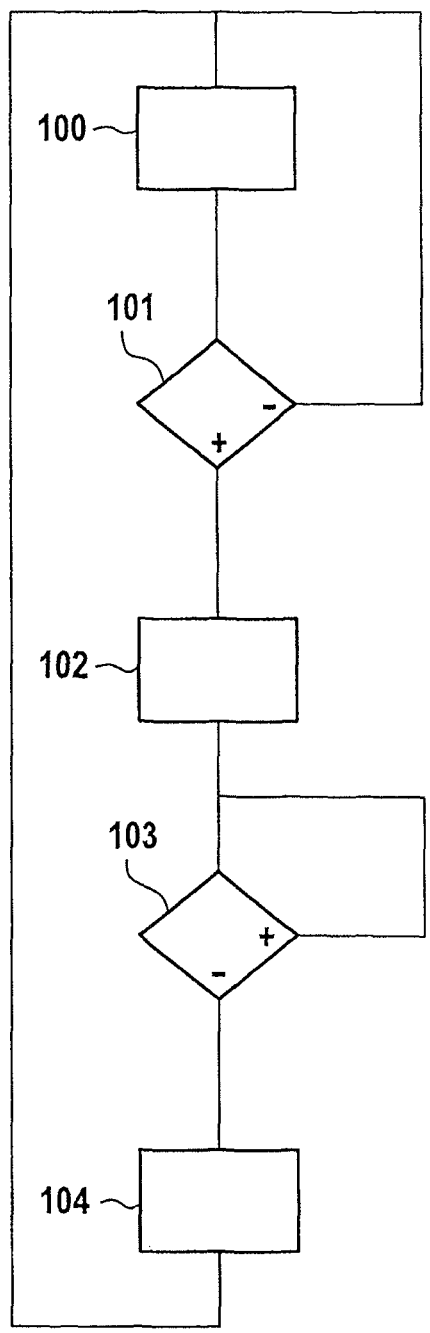
FIG. 2: a flow diagram of the behavior of the farm regulatory device from FIG. 1 in the presence of a grid fault.

The behavior of the farm regulatory device 50 in response to a grid fault is illustrated in more detail in FIG. 2.

In a first step 100 the farm regulatory device 50 regulates the setpoint values for the reactive power with a closed control loop. In a step 101, a check is made as to whether a grid fault is present in the supply grid 40. If this is not the case, the system returns to step 100 and the regulation of the setpoint values for reactive powers is continued. If, however, a grid fault is detected in step 101, then in a step 102 the setpoint values for the reactive power are frozen. Regulation of the setpoint values for the reactive power, as in step 101, is then not performed. In step 103 a determination is made as to whether the grid fault is still present. Only when the grid fault has ended does the system continue with step 104. Through this step 104, a reset delay of 50 ms is implemented before the regulation of the setpoint values for the reactive powers is started again by step 101. The reset delay in step 104 has the advantage that unwanted voltage swings can be avoided, since no dynamic processes following from the rectification of the fault act on the regulator.

The farm regulatory device 50 is designed in such a way that it freezes the setpoint values for the reactive power without delay when a grid fault is determined. As soon as the farm regulatory device 50 registers that the grid fault has ended, a reset delay of 50 ms is provided, i.e. the regulation on the basis of the frozen setpoint values for the reactive power does not begin until 50 ms after the actual end of the grid fault. This can prevent unwanted voltage variations. In order to avoid further regulation errors, it is furthermore provided that—as long as the farm regulatory device 50 for regulating the setpoint values for the reactive power incorporates an integrating branch (I-branch)—the control error at the end of the grid fault is set to zero or held constant. In this way, unwanted effects can be avoided by the I-branch when regulation of the setpoint values for the reactive power is started again.

The setpoint values for the reactive power that are supplied by the farm regulatory device 50 to the control units 17 of the wind energy installations 10 can be formed as setpoint values for reactive power or as setpoint values of voltage. In the latter case the control unit 17 can determine the respective setpoint value for the reactive power from the difference between the set voltage and the voltage in the grid internal to the wind farm.

Figure 3:
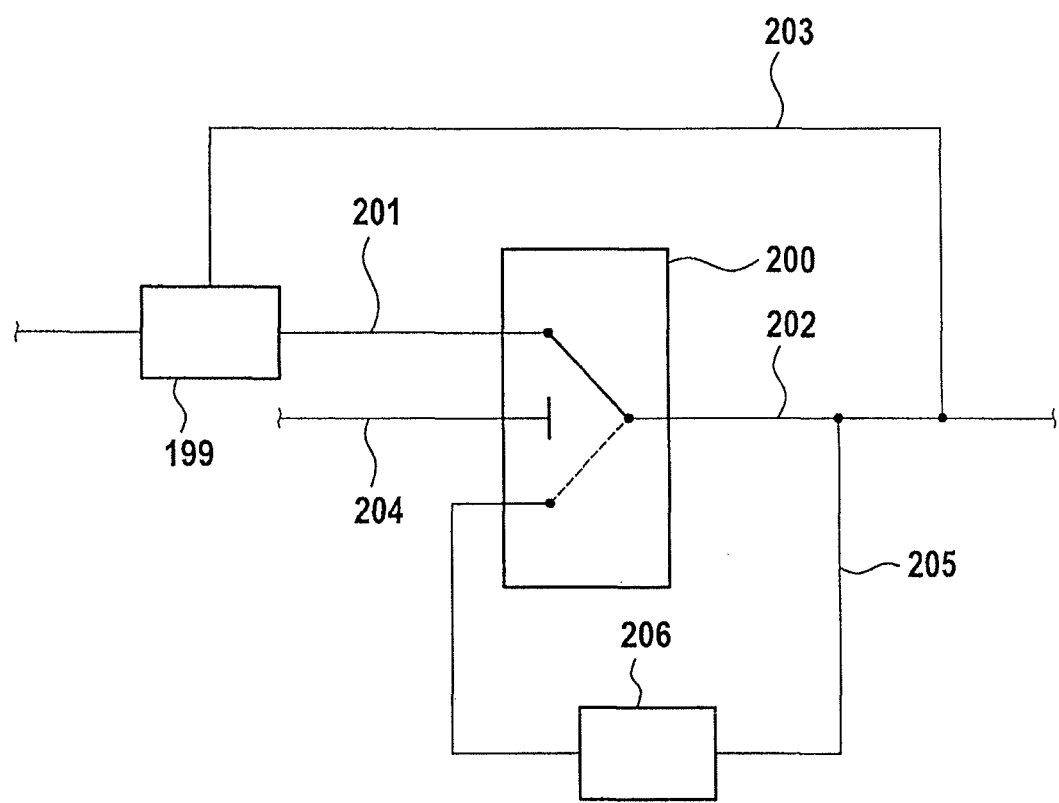
FIG. 3: a circuit diagram of a regulator for freezing setpoint values for the reactive power.

FIG. 3 shows a simplified circuit diagram of a regulator for freezing the setpoint values for the reactive power. The setpoint values for the reactive power that are determined by a closed control loop 199, shown only schematically, are supplied to an actuating element 200 via the cable 201. The actuating element 200 can here be set in such a way that the setpoint values received via the cable 201 are output to the cable 202. The setpoint values for the reactive power present in the cable 202 can then be transmitted to the control units 17 of the wind energy installations. The values output there also flow via the cable 203 back to the closed control loop 199 for determining the setpoint values for the reactive power. If a grid fault occurs in the supply grid 40, this is determined by a regulator, not shown in more detail, in the farm regulatory device 50, which then transmits a pulse via the cable 204 to the switching unit 200. This pulse has the consequence that the switching element 200 switches over, so that the signals received via the cable 201 are no longer passed on to cable 202. Rather, a loop 205, into which a delay element 206 is integrated, is closed. Via the loop 205 and the delay element 206 the setpoint values for the reactive power in the actuating element 200, present on the output cable 202, are again supplied to the actuating element 200. If the actuating element 200 is in a corresponding position, the setpoint values for reactive power supplied via the loop 204 are again fed to the output cable 202. In addition, the setpoint values that have been frozen in this way are supplied to the closed control loop 199. The freezing of the setpoint values for the reactive power according to the invention is thus achieved. If it is determined that the grid fault is no longer present in the supply grid 40, another pulse is sent via the control cable 204, and the control element 200 is switched over. The freezing of the setpoint values for the reactive power is thus negated, and the closed control loop 199 continues the regulation on the basis of the frozen values that it has previously received via the cable 203.

The invention claimed is:

1. A method for operating a wind farm with a plurality of wind energy installations connected to a grid internal to the wind farm, each with its own control unit for considering setpoint values for the reactive power, a transfer point at which the power generated in the wind farm is passed from the grid internal to the wind farm to a supply grid, and with a farm regulatory device for regulating the setpoint values for the reactive power connected with the control units of the wind energy installations, comprising:
   when a grid fault in the supply grid occurs, freezing the setpoint values for the reactive power in the farm regulatory device and not considering by the control units the setpoint values for the reactive power of the farm regulatory device in controlling the wind energy installation, and
   after the grid fault in the supply grid has ended, considering by the control units the setpoint values for the reactive power of the farm regulatory device in controlling the wind energy installation on the basis of the frozen values.

2. The method of claim 1, wherein when a grid fault is detected, the setpoint values for the reactive power are frozen without delay.

3. The method claim 1, wherein an I-branch is provided in the control system for the setpoint values for the reactive power, whose control error is set to zero or held constant after the grid fault was ended.

4. The method of claim 1, wherein after the grid fault has ended, a reset delay is maintained.

5. The method of claim 1, wherein the setpoint values for the reactive power are present in the form of setpoint values for reactive power or setpoint values of voltage.

6. The method of claim 1, wherein a drop in the voltage at the transfer point is recognized as a grid fault of the supply grid.

7. A wind farm comprising:
   a plurality of wind energy installations connected to a grid internal to the wind farm, each with its own control unit for considering setpoint values for the reactive power, a transfer point at which the electrical energy generated in the wind farm is passed from the grid internal to the wind farm to a supply grid, and a farm regulatory device for regulating the setpoint values for the reactive power connected with the control units of the wind energy installations, wherein the farm regulatory device is configured such that when a grid fault occurs in the supply grid the farm regulatory device freezes the setpoint values for the reactive power, and after the grid fault in the supply grid has ended, the farm regulatory device continues the regulation on the basis of the frozen values, wherein the control units are configured such that when a grid fault occurs, the setpoint values for the reactive power of the farm regulatory device are not considered in controlling the wind energy installation and in that after the grid fault has ended, the setpoint values for the reactive power of the farm regulatory device are considered in controlling the wind energy installation.

8. The wind farm of claim 7, wherein the farm regulatory device is configured such that when a grid fault occurs in the supply grid the setpoint values for the reactive power are frozen without delay.

9. The method of claim 1, wherein after the grid fault has ended, a reset delay between 0 and 200 ms is maintained.

* * * * *